Patented Mar. 22, 1932

1,850,154

UNITED STATES PATENT OFFICE

FRIEDRICH RASPE, OF LEVERKUSEN, AND PAUL WEISE, OF WIESDORF, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

SOLID TITANIC SULPHATE

No Drawing. Application filed March 28, 1929, Serial No. 350,799, and in Germany April 8, 1928.

The present invention relates to the manufacture of solid water soluble titanyl- or titanium sulphates from their concentrated solutions.

In the manufacture of solid water soluble titanyl- or titanium sulphates, there is a difficulty inasmuch as on evaporating to dryness, the titanium sulphate solutions tend to be hydrolyzed partially and therefore are no more completely soluble afterwards.

The invention renders possible the manufacture of solid, water soluble titanyl- and titanium sulphates. In accordance with the invention concentrated titanyl- or titanium sulphate solutions, said solutions containing generally in a liter about 400 to 500 grams of $TiO_2$, are subjected in a finely divided form to the action of a heated current of air of a temperature of about 250° C. to about 350° C., for example, in a Bühler or Krause dryer. The apparatus for carrying out our drying process is described in Ullmann, Encyklopädie der Technischen Chemie, I. edition, volume 11, page 450 (Bühler-dryer); advantageously a dryer is used which is constructed as a spray-apparatus, for example the dryer of Krause (compare Ullmann, Encyklopädie der Technischen Chemie, I. edition, volume 8, pages 111–113. The solidifying process can be favorably influenced by the addition of a solid, water binding agent which causes solidification, such as porous inert substances, which when the solid titanium sulphates have been dissolved, can be easily filtered off. Such substances are, for example kieselguhr, bauxite, asbestos meal, titanium dioxide, barium sulphate. Also, organic substances of high molecular weight capable of forming colloidal solutions may be added, such as starch, glue, gelatin or the like or such anhydrous inorganic salts which are capable of absorbing water and binding it as water of crystallization; for example, $Na_2SO_4$, $K_2SO_4$, $Al_2(SO_4)_3$, $MgSO_4$, or oxides forming such water soluble sulphates with the sulfuric acid present which are capable of absorbing water and binding it as water of crystallization, for example MgO and $Al_2O_3$. The addition of a solidifying agent not only increases considerably the efficiency of the dryer, but also prevents agglomeration of the dried powder.

In the claims and the specification, the term solid, water binding agents designates the substances described above.

Instead of adding the solid, water binding agents to the liquids to be solidified, a superficial solidification can be effected by first drying the concentrated titanyl- or titanium sulphate solutions in a finely divided form by means of air and then mixing or grinding with the solid, water binding agent. In this manner a more or less granular powder is produced, which even after prolonged storing does not agglomerate.

The quantity of the solidifying agent to be added may be varied within the widest limits, but generally an amount of about 3% to 5% calculated on the amount of the titanium sulphates is sufficient.

The invention is illustrated by the following examples, but it is not restricted thereto:

*Example 1.*—1000 liter of a heated, concentrated aqueous solution of titanyl sulphate containing in a litre about 400 grams of $TiO_2$ are atomized and dried in a Krause dryer by an air current having a temperature of about 300° C.

The powder thus obtainable can be used directly or is intimately mixed with 30 kgs. of anhydrous sodium sulphate.

*Example 2.*—To 1000 liter of the titanium sulphate solution are added 30 kgs. of anhydrous sodium sulphate, then the solution is atomized and dried in a Krause dryer by an air current having a temperature of about 300° C.

*Example 3.*—1000 liter of a concentrated aqueous solution of titanium sulphate, containing in a liter about 450 grams $TiO_2$, are mixed while hot with 40 kgs. of magnesium oxide and dried in a Krause dryer at about 300° C. The powder produced can, if desired, be ground with a further solidifying agent, for example, starch.

The term "titanium sulphate" in the claims designates the titanium sulphate as well as the titanyl sulphate.

We claim:

1. The process which comprises adding to a concentrated titanium sulphate solution 3-5%, calculated on the amount of the titanium sulphate used, of a solid, water binding agent and subjecting the solution in a finely divided form to the action of a heated current of air of a temperature of about 250-350° C.

2. The process which comprises adding to a concentrated titanium sulphate solution 3-5%, calculated on the amount of the titanium sulphate used, of anhydrous sodium sulphate and subjecting the solution in a finely divided form to the action of a heated current of air of a temperature of about 250-350° C.

3. The process which comprises adding to a titanium sulphate solution containing in a liter about 400 to about 500 grams of titanium dioxide 3-5%, calculated on the amount of the titanium sulphate used, of a solid, water binding agent and subjecting the solution in a finely divided form to the action of a heated current of air of a temperature of about 250-350° C.

4. The process which comprises adding to a titanium sulphate solution containing in a liter about 400 to about 500 grams of titanium dioxide 3-5%, calculated on the amount of the titanium sulphate used, of anhydrous sodium sulphate and subjecting the solution in a finely divided form to the action of a heated current of air of a temperature of about 250-350° C.

5. The process which comprises adding to a concentrated titanium sulphate solution 3-5%, calculated on the amount of the titanium sulphate used, of a porous inert insoluble substance, and subjecting the solution in a finely divided form to the action of a heated current of air of a temperature of about 250-350° C.

6. The process which comprises adding to a concentrated titanium sulphate solution 3-5%, calculated on the amount of the titanium sulphate used, of an organic substance of high molecular weight capable of forming colloidal solutions, and subjecting the solution in a finely divided form to the action of a heated current of air of a temperature of about 250-350° C.

7. The process which comprises adding to a concentrated titanium sulphate solution 3-5%, calculated on the amount of the titanium sulphate used, of an anhydrous inorganic salt which is capable of absorbing water and binding it as water of crystallization, and subjecting the solution in a finely divided form to the action of a heated current of air of a temperature of about 250-350° C.

8. The process which comprises adding to a titanium sulphate solution containing in one liter about 400 to about 500 grams of titanium dioxide, 3-5%, calculated on the amount of the titanium sulphate used, of a porous inert insoluble substance, and subjecting the solution in a finely divided form to the action of a heated current of air of a temperature of about 250-350° C.

9. The process which comprises adding to a titanium sulphate solution containing in one liter about 400 to about 500 grams of titanium dioxide, 3-5%, calculated on the amount of the titanium sulphate used, of an organic substance of high molecular weight capable of forming colloidal solutions, and subjecting the solution in a finely divided form to the action of a heated current of air of a temperature of about 250-350° C.

10. The process which comprises adding to a titanium sulphate solution containing in one liter about 400 to 500 grams of titanium dioxide, 3-5%, calculated on the amount of the titanium sulphate used, of an anhydrous inorganic salt which is capable of absorbing water and binding it as water of crystallization, and subjecting the solution in a finely divided form to the action of a heated current of air of a temperature of about 250-350° C.

In testimony whereof we have hereunto set our hands.

FRIEDRICH RASPE. [L. S.]
PAUL WEISE. [L. S.]